(12) United States Patent
Sosebee

(10) Patent No.: US 10,357,042 B1
(45) Date of Patent: Jul. 23, 2019

(54) AUTOMATED METHOD AND APPARATUS FOR SEPARATING POULTRY LEGS INTO THIGHS AND DRUMSTICKS

(71) Applicant: Foodmate US, Inc., Ball Ground, GA (US)

(72) Inventor: Steve Sosebee, Ball Ground, GA (US)

(73) Assignee: Foodmate US, Inc., Ball Ground, GA (US)

( * ) Notice: Subject to any disclaimer, the term of this patent is extended or adjusted under 35 U.S.C. 154(b) by 0 days.

(21) Appl. No.: 16/258,150

(22) Filed: Jan. 25, 2019

Related U.S. Application Data

(60) Provisional application No. 62/623,819, filed on Jan. 30, 2018.

(51) Int. Cl.
*A22C 21/00* (2006.01)
(52) U.S. Cl.
CPC ........ *A22C 21/003* (2013.01); *A22C 21/0007* (2013.01); *A22C 21/0053* (2013.01)
(58) Field of Classification Search
CPC ............ A22C 21/0023; A22C 21/0046; A22C 21/0053; A22C 21/0069; A22C 21/0076
USPC .......................................... 452/149–155, 166
See application file for complete search history.

(56) References Cited

U.S. PATENT DOCUMENTS

| | | | | |
|---|---|---|---|---|
| 3,882,570 A | * | 5/1975 | Zwiep .................. | A22B 5/0058 452/154 |
| 4,635,317 A | | 1/1987 | Van der Eerden | |
| 4,993,113 A | * | 2/1991 | Hazenbroek ....... | A22C 21/0076 452/136 |
| 5,015,213 A | | 5/1991 | Hazenbroek | |
| 5,490,812 A | * | 2/1996 | Schaarschmidt .. | A22C 21/0084 452/138 |
| 5,542,879 A | * | 8/1996 | Kunig ................ | A22C 21/0076 452/135 |
| 5,890,956 A | | 4/1999 | Habenicht et al. | |
| 7,662,034 B2 | | 2/2010 | Van Hillo et al. | |
| 8,277,294 B2 | * | 10/2012 | Van Hillo .......... | A22C 21/0076 452/148 |
| 8,591,298 B1 | * | 11/2013 | Watson .............. | A22C 21/0084 452/135 |

(Continued)

*Primary Examiner* — Richard T Price, Jr.
(74) *Attorney, Agent, or Firm* — Womble Bond Dickinson (US) LLP

(57) ABSTRACT

A method of separating a poultry leg into its constituent thigh and drumstick includes bending the leg at the knee to impart stress to the tissue surrounding the knee knuckle and urge the end of the drumstick bone away from the end of the thigh bone. Further stress is imparted and the bones are further urged apart by pushing the top of the drumstick in a direction opposite the knee. The tissue above the knee is then pushed up and the tissue below the knee is pushed down to maximize tension in the tissue and move the ends of the bones apart as far as possible without tearing the tissue. The tissue at the knee is then progressively sliced by a rotary cutter. The initial slice relieves tension in the tissue causing it to pull apart and move the ends of the bones further apart. The slice is then completed between the now spaced apart ends of the bones to separate the thigh from the drumstick without producing bone shards and splinters that can contaminate the meat of the thigh and the drumstick. An apparatus for performing the method is disclosed.

20 Claims, 7 Drawing Sheets

(56) References Cited

U.S. PATENT DOCUMENTS 8,961,274 B1 * 2/2015 den Boer ........... A22C 21/0076
   452/148

* cited by examiner

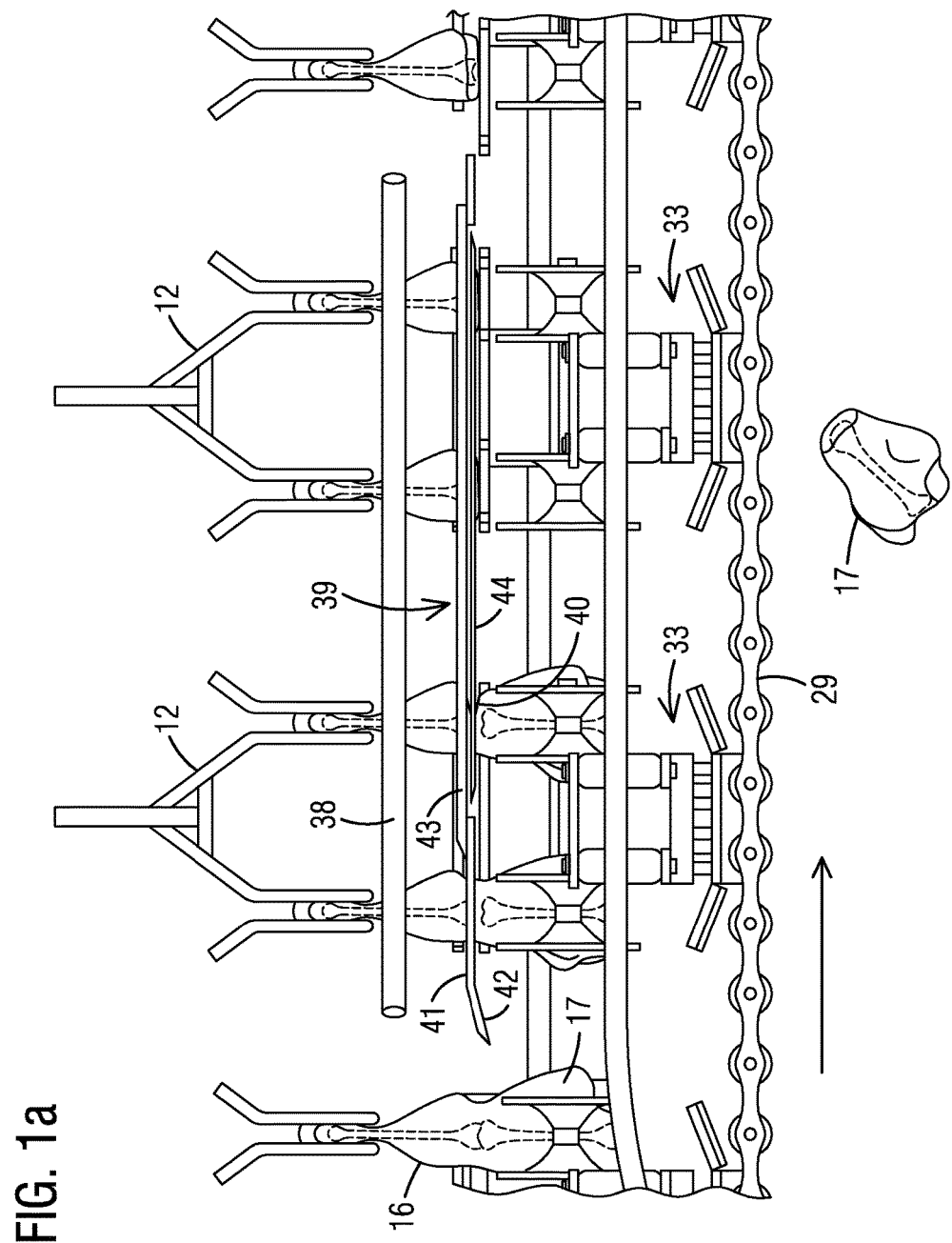

AUTOMATED METHOD AND APPARATUS FOR SEPARATING POULTRY LEGS INTO THIGHS AND DRUMSTICKS

REFERENCE TO RELATED APPLICATION

Priority is hereby claimed to the filing date of U.S. provisional patent application 62/623,819 entitled Automated Method and Apparatus for Separating Poultry Legs into Thighs and Drumsticks filed on Jan. 30, 2018, the contents of which are hereby incorporated by reference.

TECHNICAL FIELD

This invention relates generally to automated poultry processing machinery and more specifically to automated machines and methods that separate poultry legs into thighs and drumsticks at a processing station of a poultry cut-up line.

BACKGROUND

The processing of poultry such as chickens and turkeys has become highly automated. Birds generally are suspended by their legs from shackles attached to and conveyed by an overhead conveyor system. The conveyor system conveys the shackles and the birds along a processing path for de-feathering, evisceration, cut-up, and other processing. It is highly desirable to perform as many of the cut-up and processing operations as possible while the birds are suspended from their shackles to minimize human handling and ensure greater uniformity in the cutting and processing of the birds. Accordingly, the birds are conveyed through various processing stations while they move in series along the processing path suspended from their shackles. For example, the birds can be de-feathered, decapitated, opened, eviscerated, and cut into individual parts while being advanced progressively along the processing path suspended from their shackles, all without having to remove the birds from the shackles. As a result, the labor required for processing poultry can be significantly reduced while uniformity and adjustability in the sectioning of the poultry carcasses into various poultry parts is more predictable.

One processing operation that typically is performed along the processing path is the separation of the thigh from the drumstick of a poultry leg at the knee joint. Numerous automated machines have been developed in the past for performing this processing operation. Some of these machines include an overhead conveyor with shackles from which poultry legs are suspended and moved along a processing path. The suspended poultry legs are conveyed through a cutting station that may include a large rotating disc with peripheral notches. The disc rotates synchronously with the overhead conveyor, which conveys the parts around the arc of the disc. The suspended poultry legs encounter the notches in the disc, which support the leg, position the knee joint, and clamp the thigh. As the legs and thighs are moved around by the rotating disc, they engage a cutting device such as a rotating blade that cuts the drumstick from the thigh at the knee joint to produce separate parts.

While prior art techniques and machines for separating poultry thighs from drumsticks at the knee joint have been somewhat successful, they nevertheless have been plagued with shortcomings inherent in their respective designs. For example, machines that capture poultry parts in peripheral notches to stabilize them for cutting can be sensitive to the size of the parts being processed. This can require frequent adjusting, especially when the line is switched from larger birds to smaller birds or vice versa. In addition, there is a tendency for the cutting blade not to be precisely aligned with the knee joint when the cut is made. This results in not infrequent cuts through bones and/or cartilage rather than between the ends of the bones. This is not only unsightly, but can result in bone shards and splinters becoming lodged in the meat of the drumstick or thigh, thus reducing its value or requiring expensive manual clean-up. As a result of these and other shortcomings, traditional machines have production yields, i.e. the percentage of parts cut apart cleanly and not needing manual processing, of around 80 to 85%.

A need exists for an automated apparatus and method for separating poultry legs into their constituent thighs and drumsticks that successfully addresses the problems and shortcomings of the prior art. Such an apparatus and method should be highly adaptable to poultry legs of different sizes without manual adjustment, should consistently produce cuts between the bones of the knee joint and not through bone or cartilage, and should operate with a production yields as high as 90 to 95%. It is to the provision of such an apparatus and method that the present invention is primarily directed.

SUMMARY

Briefly described, poultry legs each comprising a drumstick connected to a thigh are conveyed along a processing path suspended by their ankle joints from shackles. A processing apparatus is positioned below the moving shackles for carrying out the method of the present invention. The apparatus includes a plurality of intermediate positioning assemblies attached to an endless chain having an upper flight and a lower flight. The endless chain is driven synchronously with the shackles so that the upper flight of the chain moves at the same speed as the shackles and poultry legs above. The intermediate positioning assemblies are spaced along the chain so that one of the intermediate positioning assemblies aligns below one of the shackles as the two move in synchronization along the processing path.

As a shackle and an intermediate positioning assembly move along together, a pair of poultry legs initially hangs down between opposed open parts of the intermediate positioning assembly. A cam rail and roller system then pivots the open parts inwardly to close them around the poultry legs. This process bends the poultry legs at the knee introducing stress in the tissue surrounding the knee joint and positioning the poultry leg for cutting. The processing apparatus also includes a tensioning and cutting assembly located intermediate the ends of the top flight of the chain. The tensioning and cutting assembly includes primary and secondary tensioning plates and a rotary cutter. The bent and tensioned poultry leg engages the primary tensioning plate followed by the secondary positioning plate. These plates are shaped and positioned to maximize the tension in the tissue surrounding the knee knuckle and urge the ends of the bones of the drumstick and thigh apart.

With the tension in the tissue maximized and the ends of the bones urged apart, the poultry leg is engaged by the edge of a rotary cutter, which is sized to slice the tissue of the poultry leg progressively at the knee. As the cut begins, tension in the tissue begins to be released causing the tissue to pull apart and the ends of the bones to move further apart. The rotary blade ultimately slices completely through the poultry leg at the knee knuckle to separate the leg into a thigh and a drumstick. As a result of the bending, tensioning, and progressive slicing, the rotary blade makes its slice between the urged apart ends of the bones and does not engage, cut, or splinter either of the bones. The cut is clean and the resulting thigh and drumstick are free of bone shards and splinters that lead to the need for additional hand processing. Yields of 95% and more have been realized with the method and apparatus of the present invention.

Thus, a unique and improved method and apparatus for separating a poultry leg into a thigh and a drumstick is provided. The method and apparatus successfully meet and resolve the shortcomings of prior art techniques. The method and apparatus works with a variety of sizes of birds without manual adjustment, operates at high processing speeds, and increases traditional yields of 85% and below to yields of 95% and higher. These and other features, aspects, and advantages of the invention will become more apparent upon review of the detailed description set forth below taken in conjunction with the attached drawing figures, which are briefly described as follows.

BRIEF DESCRIPTION OF THE DRAWINGS

FIG. 1a is an enlarged view of a portion of FIG. 1 showing the tensioning and cutting assembly.

DETAILED DESCRIPTION

Figure 1:
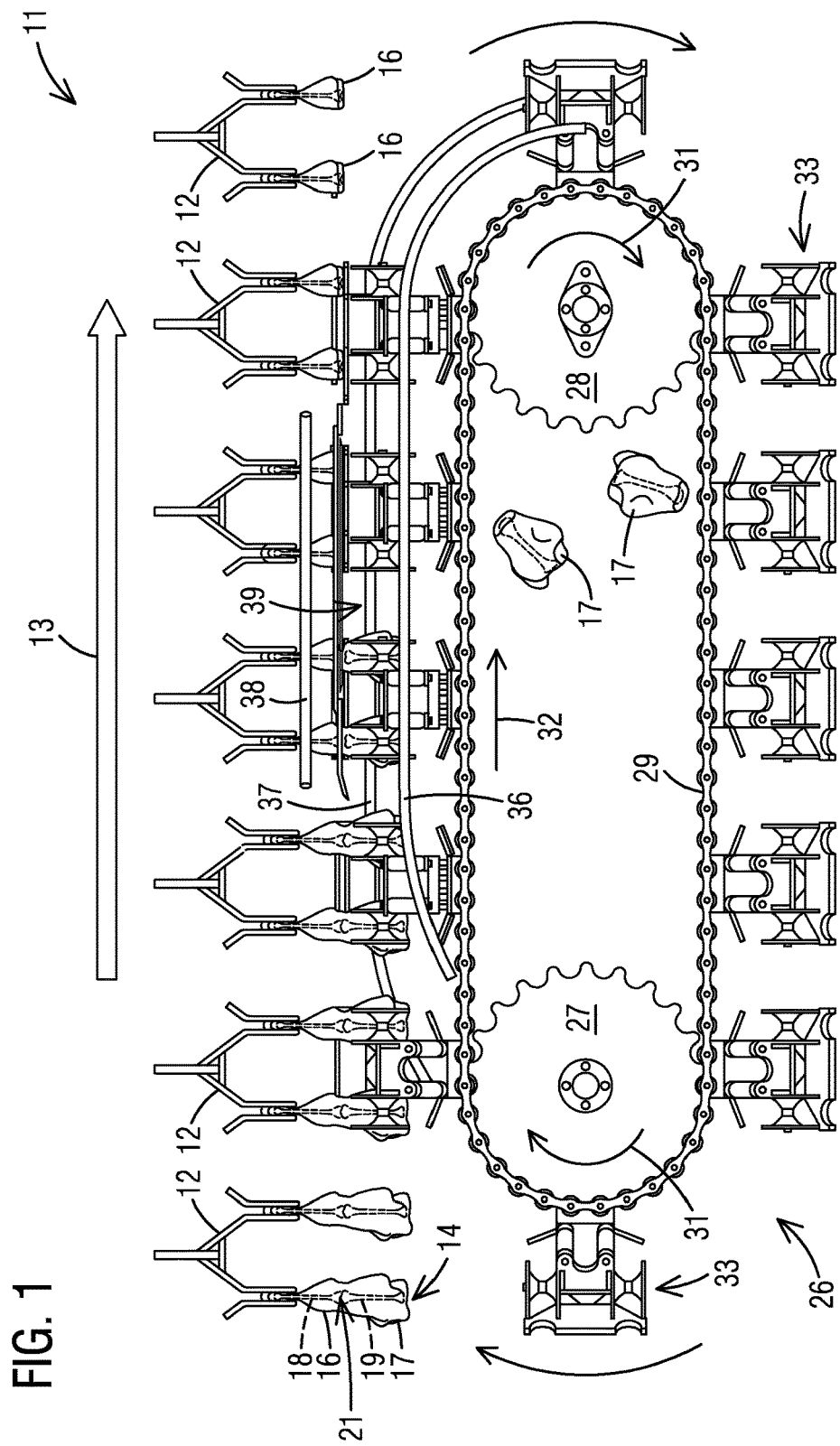
FIG. 1 is a simplified front elevational view of an apparatus for separating poultry legs into thighs and drumsticks that embodies principles of the present invention in one preferred form.

Reference will now be made to the drawing figures, wherein like parts are identified with like reference numerals throughout the several views. FIG. 1 shows an apparatus 11 for separating poultry legs into their constituent thighs and drumsticks according to the methodology of the present invention. It will be understood that FIG. 1 is a simplified view in that various non-relevant components of the apparatus such as support structure, drive motors, and the like have been removed for purposes of clarity. The apparatus 11 is located below a plurality of shackles 12 that are suspended from an overhead conveyor (not shown). Each shackle 12 is moved in direction 13 along a processing path by the conveyor as is known in the art.

The shackles 12 are configured to hold poultry bodies suspended by their ankles so that the poultry can be processed and cut up at various stations along the processing path. For purposes of the present invention, most of the body of each poultry body has already been removed at prior stations so that the remaining poultry parts suspended from the shackles are the legs 14 of the birds. Each leg comprises a thigh 17 and a drumstick 16 connected at a knee knuckle 21. Each thigh 17 includes thigh meat surrounding a femur bone and each drumstick 16 includes drumstick meat surrounding a tibia/fibula bone. For simplicity, these bones will be referred to herein as the drumstick bone and the thigh bone. The knee knuckle normally is relatively tightly held together by tendons and other tissue that surround the knuckle.

The apparatus 11 generally comprises an upstream sprocket 27 and a downstream sprocket 28 around which a drive chain 29 extends. At least one of the sprockets is driven by a drive system (not shown) in direction 31. This causes the upper flight of the chain 29 to move in direction 32, which is the same as the processing direction 13. Further, the rate at which the sprocket is driven moves the chain 29 in direction 32 at the same rate as the conveyor and shackles above so that the chain can be said to move in synchronization with the shackles.

A plurality of intermediate positioner assemblies is mounted to the chain 29 at spaced apart intervals. The details and function of the intermediate positioner assemblies are discussed below, but generally they help to stabilize poultry legs and position them for cutting. The intermediate positioner assemblies are carried around by the chain 29 as indicated by the arrows so that they move along the upper flight of the chain in the processing direction, around the downstream sprocket 28, along a return path on the bottom flight of the chain, and around the upstream sprocket 27 to begin the cycle again. The location of each intermediate positioner assembly on the chain and the spacing between assemblies ensures that one intermediate positioner assembly 33 moves synchronously and directly below a corresponding shackle 12 as the shackles and intermediate positioner assemblies move synchronously along the processing path.

The operation of key components of the apparatus 11 is described in detail below. In general, however, the intermediate positioner assemblies function by closing around a pair of poultry legs, arching and stretching the legs at the knee, and holding the leg firmly in place as it moves along the processing path. The closing of the intermediate positioner assemblies is facilitated by a front cam rail 36 and a rear cam rail 37. These cam rails engage each intermediate positioner assembly when it is aligned below a shackle so that a pair of poultry legs is positioned in the assembly.

A guide rail 38 presses on the poultry legs just beneath the shackles to stretch and stress the tissue around the knee knuckle further and to help urge the thigh bone and the drumstick bone apart at the knee. Finally, the poultry legs encounter a tensioning and cutting assembly 39, which increases the stress in the tissue around the knee knuckle, further urges the bones apart at the knee joint, and progressively cuts or slices the tissue of the poultry leg between the separated bones of the knee knuckle. The resulting separated thighs 17 then fall away to be collected and the drumsticks are conveyed downstream along with the shackles for collection or further processing.

The process has proven to increase yield substantially over prior art separation techniques. This is due at least in part to the fact that the tissue of the poultry legs is stressed and stretched at the knee knuckle to the point where the bones are urged apart at the joint and the surrounding tissue is under tension. The blade of the tensioning and cutting assembly 39 is relatively large by comparison to the blades of other cutting stations. This allows for the blade to start its cut further upstream along the tensioning and cutting assembly while the tissue is under tension. The beginning of the cut early begins to release some of the tension in the tissue surrounding the knee knuckle, which allows the bones to separate further before the blade slices completely through the poultry leg. As a result, there are far fewer instances where the bones themselves are cut or splintered resulting in pieces remaining in the meat. In fact, yields of 95% or more have been realized using the methodology of the present invention.

FIG. 1a is an enlarged view of a portion of FIG. 1 showing the tensioning and cutting assembly 39 more clearly. The tensioning and cutting assembly 39 comprises a primary tensioning plate 41 with an upsloping forward edge 42. A secondary tensioning plate 43 extends downstream from the primary tensioning plate 41 and is raised a bit higher than the primary tensioning plate. A rotary cutting blade 44 moves beneath the secondary tensioning plate 43 and extends from the secondary tensioning plate 43 into the path of poultry legs moving along the processing path.

A poultry leg initially engages the upsloping forward edge of the primary tensioning plate, which progressively exerts and upward force on the leg at the knee as the leg moves along the plate. The leg then encounters the secondary tensioning plate 43, which exerts even more upward force on the leg at the knee. At this point, the tissue around the knee knuckle is under significant tension and the bones are urged apart at the knee. The rotary blade 44 then begins to slice into the tissue as shown at 40. This progressively releases tension in tissue and allows the bones to separate further at the knee knuckle. The cut then continues completely through the poultry legs and between the separated bones to sever the thighs 17 from the drumsticks 16 while not engaging and slicing bone.

Figure 2:
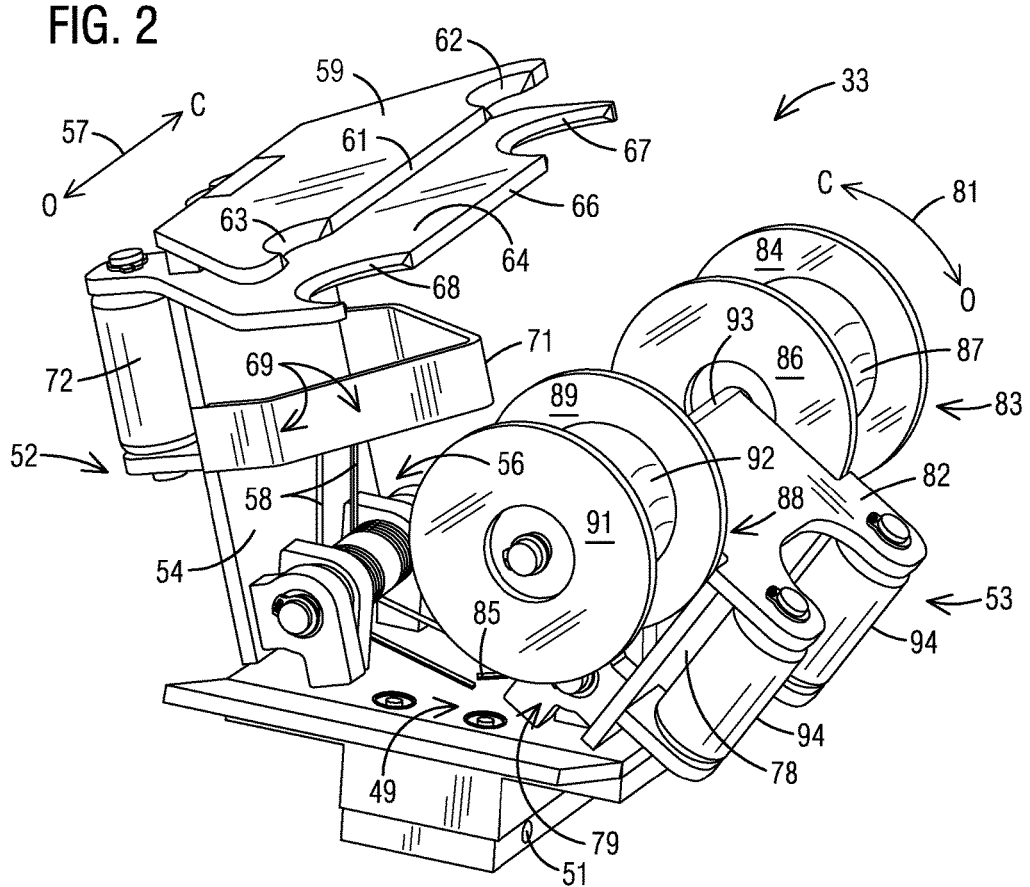
FIG. 2 is a perspective view of one of the intermediate positioners of the apparatus of FIG. 1 for positioning poultry legs for cutting.

FIG. 2 illustrates a preferred configuration of one of the intermediate positioner assemblies of the present invention. The assembly 33 comprises a base 49 attachable to the chain 29 via attachment features 51. A drumstick positioner assembly 52 comprises a support 54 that is hingedly attached to the base 49 via a hinge assembly 56. A top plate 59 is attached to the upper end of the support 54 and includes a forward edge 61. Spaced apart arcuate notches 62 and 63 are formed in the forward edge 61. A bottom plate 64 is attached to the support 54 below and spaced from the top plate 59 and includes a forward edge 66. Spaced apart arcuate notches 67 and 68 are formed in the forward edge 66 of the bottom plate and align with the notches 62 and 63 in the forward edge of the top plate.

A guide 69 projects inwardly from the support 54 below the top and bottom plates 59 and 64 and tapers to an apex 71, which is aligned midway between the notches. The guide helps to direct drumsticks of poultry legs into respective aligned notches when the intermediate positioning assembly closes around the poultry legs, as detailed below. It will be realized that with the just described structure, the drumstick positioner assembly 52 is pivotable about the hinge assembly 56 between an open position O and a closed position C as indicated at 57. The hinge assembly 56 includes springs 58 that yieldably bias the drumstick positioner assembly to its open position O. A pair of rollers 72 is attached to the back of the support 54 for engaging the rear cam rail 37 (FIG. 1), which pivots the drumstick positioner assembly to its closed position C as the intermediate positioner assembly moves along the processing path.

A thigh positioning assembly 53 is hingedly attached to the base 49 via hinge assembly 79. The thigh positioning assembly includes a support 78 to the top of which a plate 82 is attached. The plate 82 carries an axle 92 that extends transversely relative to the support 78 and protrudes beyond the edges of the plate 82. A first thimble 83 is rotatably mounted on one protruding end of the axle 93 and has spaced apart flanges 84 and 86 joined by a central drum 87. Preferably, the central drum 87 tapers from each flange to a smaller diameter center portion to form a saddle shape of the central drum 87.

A second thimble 88 is rotatably mounted on the other protruding end of the axle 93 and is configured the same as the first thimble 83. The second thimble 88 includes spaced flanges 89 and 91 joined by a saddle-shaped central drum 92. It will be seen that the thigh positioning assembly 53 is pivotable by virtue of the hinge assembly 79 between an open position O and a closed position C as indicated at 81 in FIG. 2. The hinge assembly 79 includes springs 85 that yieldably bias the thigh positioning assembly 53 to its open position O. Rollers 94 project from the back of support 78 for engaging the forward cam rail 36 (FIG. 1), which pivots the thigh positioner assembly to its closed position C as the intermediate positioner assembly 33 moves along the processing path.

Figure 3:
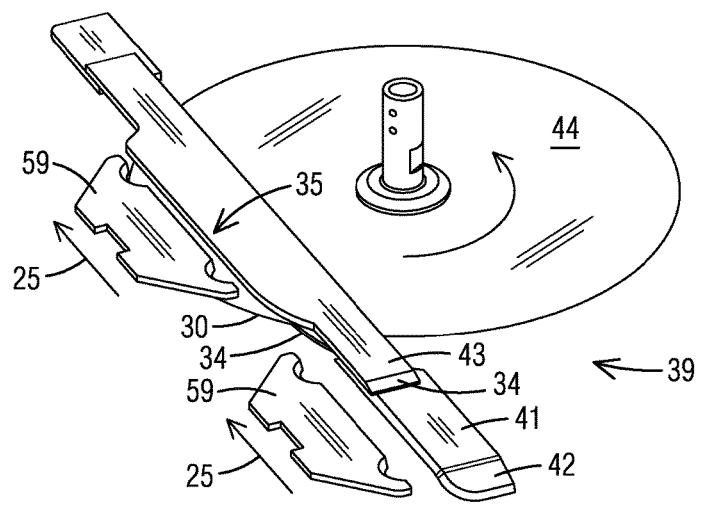
FIG. 3 is a perspective view of a tensioning and cutting assembly that tensions the tissue around the knee knuckle and cuts through the knee when the tissue is tensioned.

FIG. 3 illustrates fundamental elements of the tensioning and cutting assembly 39 shown in FIG. 1a. The assembly 39 comprises a primary tensioning plate 41 located at the upstream end of the assembly. The primary tensioning plate 41 is formed with a ramped forward end 42. A secondary tensioning plate 43 is positioned downstream of the primary tensioning plate 41 and has a ramped forward edge 34 that rises to the upper surface of the secondary tensioning plate 43. The secondary tensioning plate is formed with a rearwardly projecting bulge 35. A bottom ramp 34 is attached to and projects downwardly from the bottom surface of the secondary tensioning plate 43 as shown.

The primary and secondary tensioning plates 41 and 43 are positioned so that the top plates 59 of intermediate positioning assemblies 33 move adjacent to the tensioning plates as they are conveyed along the processing path as indicated by arrows 25. A rotary cutter 44 is positioned on the other side of the tensioning plates 41 and 43. A portion of the rotary cutter extends below the secondary tensioning plate 43 generally within the area of the bulge 35. The rotary cutter 44 protrudes from beneath the secondary tensioning plate 43 a distance sufficient to cut through passing poultry legs held within adjacent moving intermediate positioning assemblies, as described in more detail below.

A poultry leg being moved downstream within an intermediate positioning assembly first encounters the ramped end 42 of the primary tensioning plate at a position near the location of the knee knuckle. The ramped end progressively pushes upward on the poultry leg, thereby tensioning the tissue surrounding the knee knuckle. This tension also tends to urge the bones of the thigh and drumstick apart at the knee knuckle. The poultry leg then encounters the ramped forward edge 34 of the secondary tensioning plate 43 and is pushed upwardly even further, thereby tensioning the tissue further and urging the bones apart even more. Just before the poultry leg encounters the edge of the rotary cutter at 30, it engages the bottom ramp 34, which pushes the tissue below the knee knuckle downwardly. The combination of the upward force exerted by the secondary tensioning plate 43 and downward force exerted by the bottom ramp 34 maximizes the stress within the tissue without tearing it and urges the bones of the thigh and drumstick apart as much as possible.

With the tissue highly tensioned and the bones urged apart at their ends, the poultry leg engages the edge of the rotary cutter 44, which begins to slice through the tissue at the knee. The rotary cutter 44 is positioned so that it makes the slice at a location between the now urged apart ends of the thigh and drumstick bones. As soon as the slice begins, the tissue surrounding the knee knuckle begins to pull apart as a result of the tension within the tissue. This, in turn, allows the ends of the thigh and drumstick bones to begin to move further apart as they become less constrained by the tissue.

As the cut progresses completely through the poultry leg, the edge of the rotary cutter 44 passes between the separated ends of the bones without encountering or cutting through the bones themselves. The result is a thigh that is cleanly separated from the drumstick with no bone shards or splinters contaminating the meat of these poultry pieces. Since the thigh and drumstick are not contaminated with bone shards or splinters, they do not require further manual processing and can move directly on to packaging, deboning, or other processing. It has been found that the yield of uncontaminated poultry thighs and drumsticks is increased substantially using the methods of this invention from around 85% or lower to around 95% or higher, thus saving time and money for a poultry processing operation.

Figure 4A:
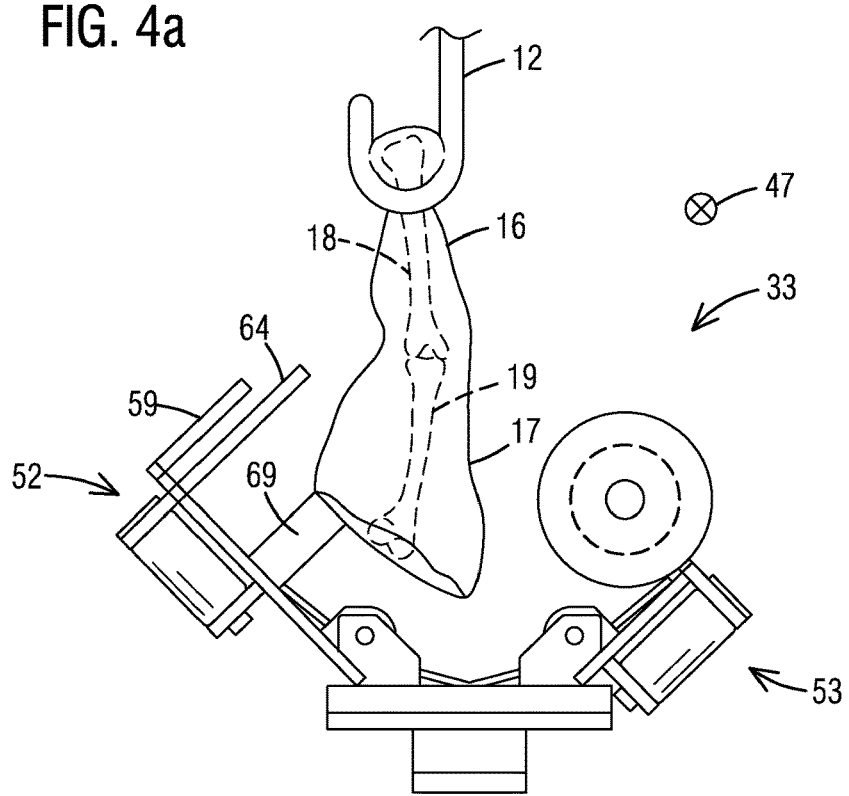
FIG. 4a is a side elevational view illustrating a first step of the separation process wherein an intermediate positioner is moved into synchronous alignment with a poultry leg suspended from a shackle above.

FIGS. 4*a*-4*g* illustrate in sequence the method steps of this invention as carried out by the above-described apparatus to separate poultry legs into poultry thighs and drumsticks. FIG. 4*a* shows a poultry leg comprising a drumstick 16 connected to a thigh 17 at a knee 21. The drumstick has an internal drumstick bone 18 and the thigh has an internal thigh bone 19 and these bones meet at the knee joint 21. The poultry leg is suspended from a shackle 12, which conveys the poultry leg in a processing direction into the page as indicated at 47. An intermediate positioning assembly 33 has just rounded the upstream sprocket 27 (FIG. 1) and has come into vertical alignment beneath shackle 12. From here, the shackle 12, the poultry leg, and intermediate positioning assembly 33 move synchronously and vertically aligned with each other along the processing path.

At the initial step shown in FIG. 4*a*, the thigh positioner 53 and the drumstick positioner 52 are held yieldably in their open positions by their respective springs 85 and 58 (FIG. 2). As a result, the poultry leg is suspended between the open drumstick and thigh positioners as shown. In the next step shown in FIG. 4*b*, the rollers 94 of the thigh positioner 53 have engaged the forward cam rail 36 and the rollers 72 of the drumstick positioner 52 have engaged the rear cam rail 37. The forward and rear cam rails are shaped in such a way that they progressively move the thigh positioner and the drumstick positioner from their open positions to their closed positions. As this occurs, the guide 69 (FIG. 4*a*) directs the upper portion of the poultry leg into one pair of aligned arcuate slots in the top plate 59 and bottom plate 64 of the drumstick positioner. Simultaneously, the thigh portion 17 of the poultry leg is captured between the flanges of one of the thimbles 88.

Figure 4B:
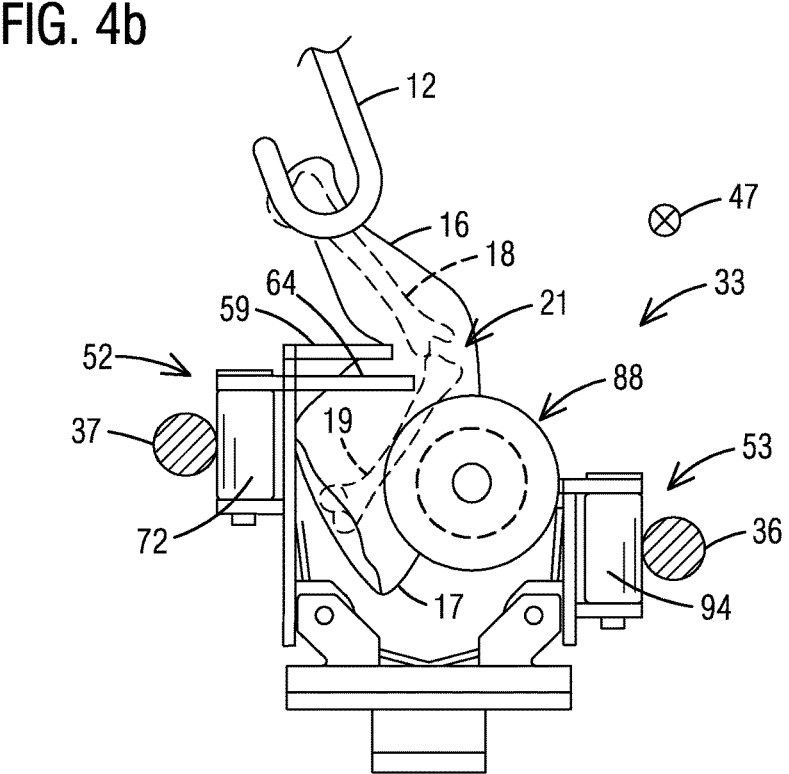
FIG. 4b is a side elevational view illustrating a second step of the separation process wherein the intermediate positioner is closed around the poultry leg to bend and tension the leg at the knee and to begin positioning the leg for cutting.

As the closing process progresses, the top and bottom plates 59 and 64 push the bottom of the drumstick 16 to the right in FIG. 4*b* while the thimble 88 pushes the thigh 17 to the left. This bends the poultry leg at the knee 21 and, since the ankle knuckle remains captured in the shackle 12, tensions the tissue surrounding the knee knuckle. The tension, in turn, exerts force that tends to urge the ends of the thigh bone and drumstick bone apart at the knee knuckle. The knee portion of the poultry leg also is exposed and oriented in preparation for being cut.

Figure 4C:
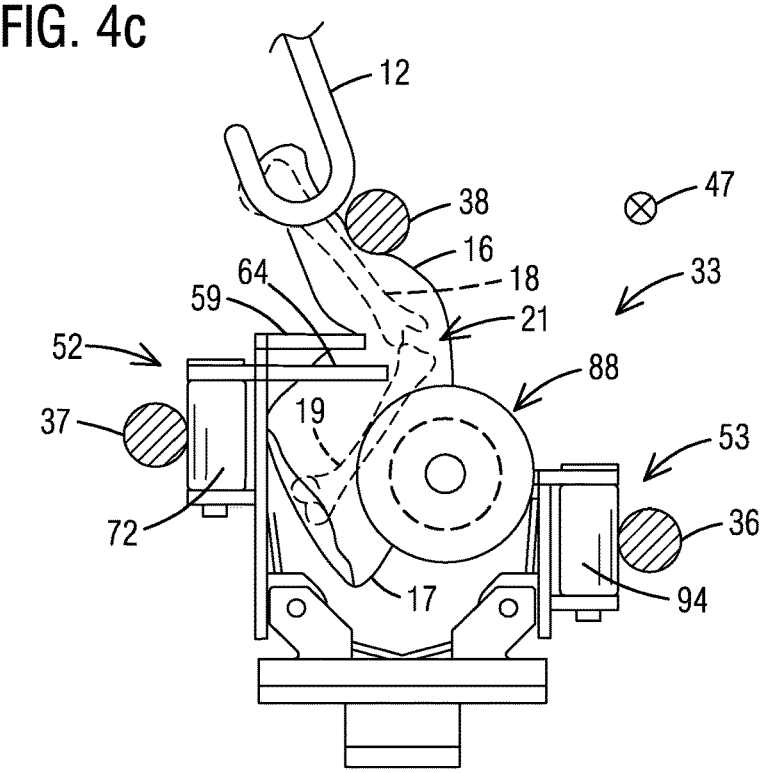
FIG. 4c is a side elevational view illustrating a third step of the separation process wherein a guide rail engages the drumstick adjacent the shackle to increase the tension in the tissues surrounding the knee knuckle.
Figure 4D:
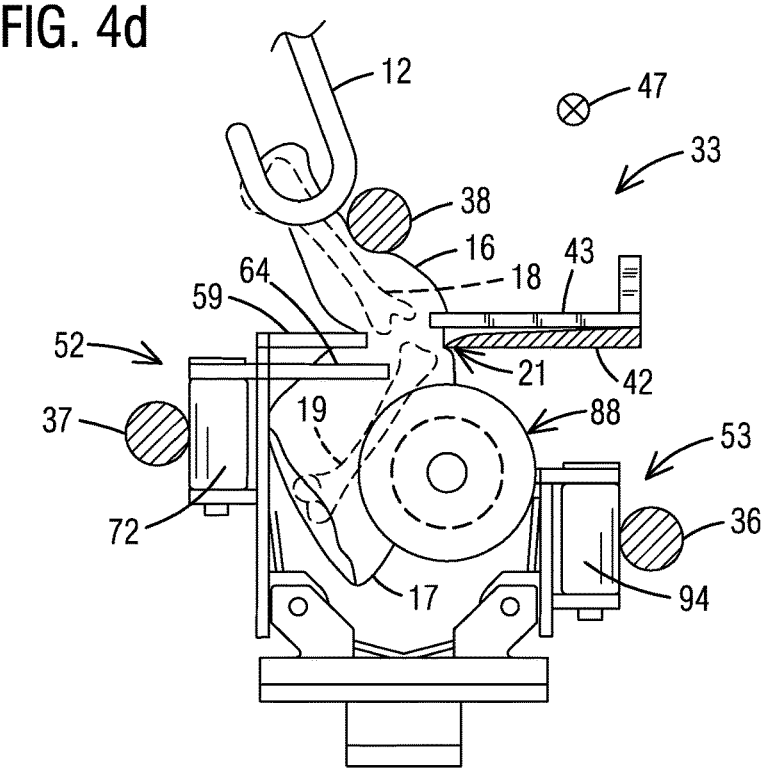
FIG. 4d is a side elevational view illustrating a fourth step of the separation process wherein the poultry leg initially engages a primary tensioning plate to increase tension and begin to urge the bones of the drumstick and thigh further apart at the knee.

At the next step of the process shown in FIG. 4*c*, the poultry leg is engaged at the upper part of the drumstick by the upper guide rail 38. Upper guide rail 38 is shaped and positioned to move the upper part of the drumstick to the left in FIG. 4*c*. This, in turn, further tensions the tissue around the knee knuckle and further urges the bones of the thigh and drumstick apart at the knee knuckle. At the next step of the process shown in FIG. 4*d*, the somewhat tensioned poultry leg engages the ramped forward edge 42 of the primary tensioning plate just above the knee joint. As the poultry leg rides up the ramped forward edge, the edge exerts upward force on the poultry leg at the knee imparting even greater tension to the tissue surrounding the knee knuckle and urging the end of the drumstick bone up and away from the end of the thigh bone. The bones begin to separate from each other further as illustrated in FIG. 4*d*.

Figure 4E:
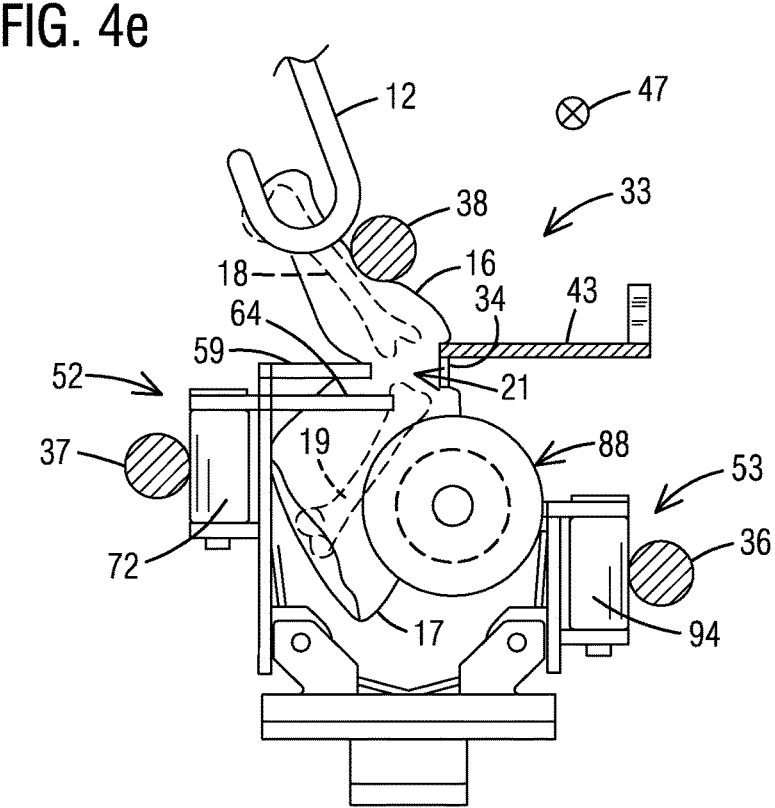
FIG. 4e is a side elevational view illustrating a fifth step of the separation process wherein the poultry leg engages a secondary tensioning plate to maximize tension in the tissue surrounding the knee knuckle and urge the bones even further apart in preparation for cutting.

In the next step shown in FIG. 4*e*, the poultry leg rides up the ramped forward edge of the secondary tensioning plate 43 and onto the edge of its top surface. At substantially the same time, the poultry leg is engaged just below the knee joint by the bottom ramp 34. This pushes the tissue just below the knee downwardly. The action of the primary and secondary tensioning plates and the bottom ramp maximizes the tension within the tissue surrounding the knee knuckle without causing the tissue to tear and also separates the ends of the bones as much as possible at the knee joint as shown in FIG. 4*e*.

Figure 4F:
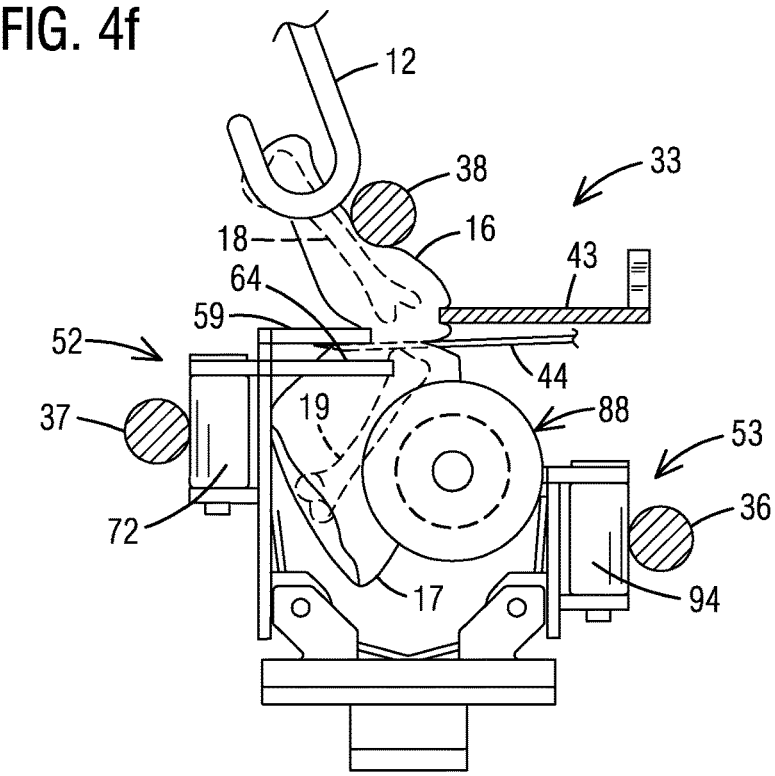
FIG. 4f is a side elevational view illustrating a sixth step of the separation process wherein the blade begins to cut the tensioned tissue of the poultry leg at the knee and between the bones of the drumstick and thigh.

In the next step shown in FIG. 4*f*, the fully tensioned poultry leg initially engages the edge of the rotary cutter 44. The diameter of the rotary cutter is relatively large so that the cut proceeds relatively gradually. As the tissue begins to be sliced by the cutter, the tension built up in the tissue causes the tissue to begin to pull apart at the knee knuckle of the poultry leg. This, in turn, allows the gap between the end of the thigh bone and the end of the drumstick bone to widen even further. By the time the edge of the rotary blade reaches the locations of the bone ends, the ends are sufficiently far apart that the blade does not encounter and does not slice through bone and cartilage. As a result, no bone shards or splinters are created to contaminate the meat of the thigh or the meat of the drumstick.

Figure 4G:
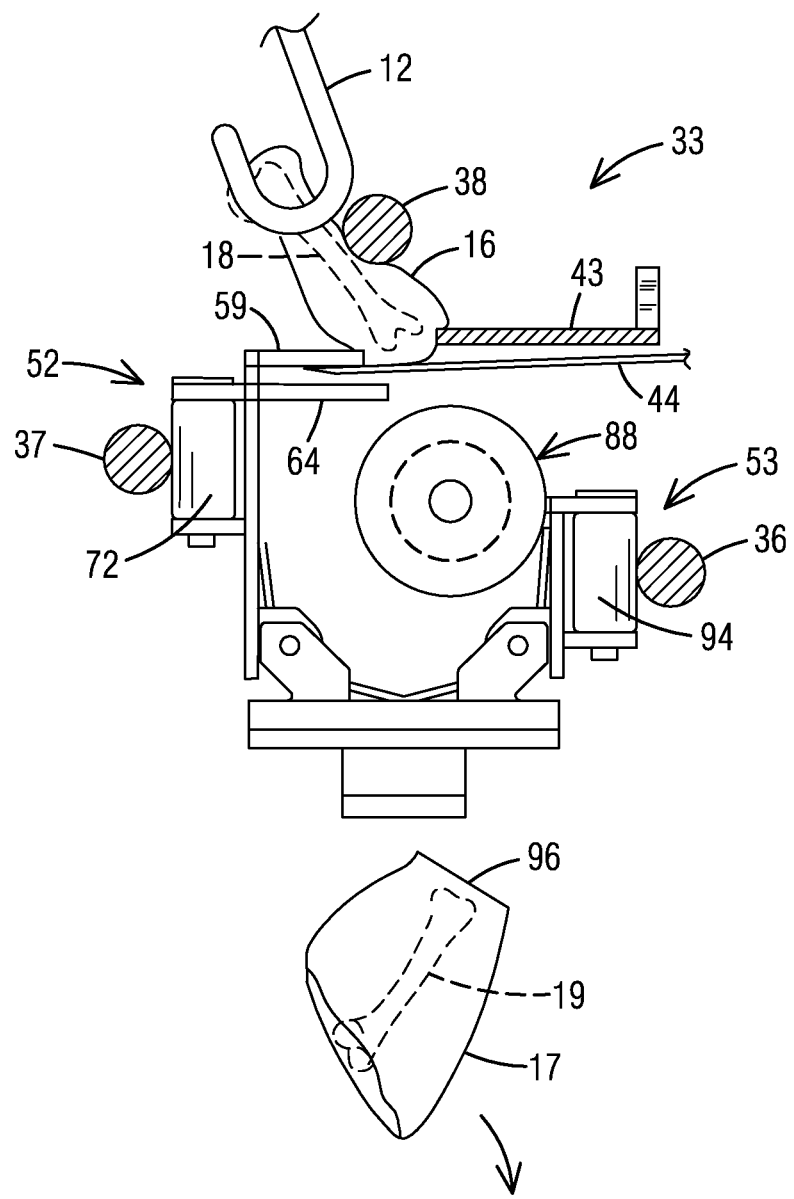
FIG. 4g is a side elevational view illustration a seventh step of the separation process wherein the blade has sliced completely through the poultry leg between the bones of the drumstick and thigh to separate the thigh from the drumstick.

In the final step shown in FIG. 4*g*, the poultry leg has progressed sufficiently so that the rotary blade 44 has sliced completely through the leg at the location of the knee knuckle to separate the thigh 17 from the drumstick 16. The cut is clean and free of bone shards and splinters. The thigh 17 falls away to be collected and the drumstick 16 is conveyed on by the shackle 12 to be collected downstream. The separated thighs and drumsticks can then be packaged, or subjected to additional processing such as deboning prior to being packaged.

The invention has been described herein in terms and within the context of preferred embodiments and methodologies considered by the inventor to represent the best modes of carrying out the invention. It will be understood by the skilled artisan, however, that a wide gamut of additions, deletions, and modifications, both subtle and gross, might well be made to the illustrative embodiments described above without departing from the spirit and scope of the invention, which is delineated only by the claims.

What is claimed is:

1. An automated method for separating a poultry leg having an ankle, a knee, a thigh bone, a drumstick bone, and a knee knuckle into a thigh and a drumstick, the method comprising the steps of:
    (a) suspending the poultry leg by the ankle with the poultry leg extending downwardly;
    (b) conveying the suspended poultry leg in a processing direction;
    (c) securing and positioning the suspended poultry leg as the poultry leg is conveyed in the processing direction;
    (d) bending the poultry leg at the knee to create tension in tissue and ligaments surrounding the knee joint and to urge the thigh bone and the drumstick bone apart at the knee joint;
    (e) initiating a cut through tissue at the knee joint to begin to relieve the tension in the tissue thereby allowing the thigh bone and the drumstick bone to separate further at the knee joint;
    (f) continuing the cut between the ends of the thigh bone and the drumstick bone to separate the thigh from the drumstick without cutting the thigh bone or the drumstick bone;
    (g) collecting the thigh; and
    (h) collecting the drumstick.

2. The method of claim 1 further comprising the step following step (d) of creating additional tension in tissue and ligaments surrounding the knee joint prior to step (e).

3. The method of step 2 wherein creating additional tension comprises engaging the leg above the knee joint with at least one tensioning plate as the leg is conveyed in the processing direction.

4. The method of claim 3 wherein the tensioning plate has an upsloping forward edge that progressively urges the drumstick away from the thigh as the leg is conveyed in the processing direction.

5. The method of claim 4 further comprising engaging the leg above the knee with a second tensioning plate higher than the first tensioning plate after the leg is engaged by the first tensioning plate.

6. The method of claim 1 wherein step (c) comprises progressively capturing the leg between a thigh positioner and a drumstick positioner.

7. The method of claim 6 wherein the thigh positioner and the drumstick positioner are components of an intermediate positioning assembly moving synchronously with the leg in the processing direction.

8. The method of claim 7 wherein the thigh positioner and the drumstick positioner are movable components of the intermediate positioning assembly and wherein step (c) comprises moving the thigh positioner and the drumstick positioner progressively toward one another with the leg positioned between them.

9. The method of claim 1 wherein step (d) comprises engaging the leg with a guide rail.

10. The method of claim 9 wherein engaging the leg with a guide rail comprises engaging the leg with the guide rail between the ankle and the knee as the leg is conveyed in the processing direction.

11. The method of claim 1 wherein step (e) comprises engaging the tissue with a rotating blade as the leg is conveyed in the processing direction.

12. The method of claim 11 wherein the rotating blade is sized so that the initial cut made by the blade is in the tissue surrounding the knee.

13. The method of claim 1 wherein step (f) comprises conveying the leg past a rotating blade.

14. The method of claim 1 wherein step (g) comprises allowing the separated thigh to fall to a collection location and step (h) comprises continuing to convey the drumstick to a separate location.

15. An apparatus for separating a poultry leg having an ankle, a knee, a thigh bone, a drumstick bone, and a knee knuckle into a thigh and a drumstick, the apparatus comprising:
    a shackle from which the poultry leg can be suspended by its ankle with the leg extending downwardly;
    the shackle being attached to a conveyor configured to move the shackle and a poultry leg suspended therefrom in a processing direction;
    a positioning assembly vertically aligned below the shackle;
    a drive system configured to move the positioning assembly in the processing direction synchronously with the shackle above;
    the positioning assembly comprising a thigh positioner and a drumstick positioner selectively movable toward each other to capture and position a poultry leg suspended from the shackle above as the poultry leg and the positioning assembly are conveyed together in the processing direction;
    the thigh positioner and the drumstick positioner being configured to bend the poultry leg at the knee as the poultry leg is captured to create initial tension in tissue and ligaments surrounding the knee joint and to urge the thigh bone and the drumstick bone apart at the knee joint;
    a knife located along the processing path and positioned to be engaged by the tensioned tissue and ligaments surround the knee joint as the poultry leg and positioning assembly move together in the processing direction to begin to cut through the tensioned tissue and ligaments and allow the thigh bone and the drumstick bone to separate further as a result of tension relief;
    continued movement of the poultry leg in the processing direction past the blade severing the poultry leg into a thigh and a drumstick without cutting the thigh bone and drumstick bone.

16. The apparatus of claim 15 further comprising an upper guide rail located along the processing path and being shaped and positioned to engage the captured drumstick to tension further the tissue around the knee knuckle and further urge the bones of the thigh and drumstick apart at the knee.

17. The apparatus of claim 15 further comprising a primary tensioning plate located along the processing path upstream of the knife, the primary tensioning plate being positioned and configured to engage the poultry leg just above the knee joint to exert upward force on the poultry leg at the knee to impart even greater tension to the tissue surrounding the knee knuckle.

18. The apparatus of claim 17 further comprising a secondary tensioning plate located downstream of the primary tensioning plate and being positioned and configured to engage the poultry leg above the knee joint to exert additional upward force on the poultry leg at the knee and impart maximum tension to the tissue surrounding the knee knuckle before the poultry leg encounters the knife.

19. The apparatus of claim 15 wherein the knife is a rotary knife.

20. The apparatus of claim 15 wherein the thigh positioner comprises a thimble in which the thigh is captured and positioned as the positioning assemblies capture the poultry leg.

\* \* \* \* \*